United States Patent [19]

Kautt

[11] Patent Number: 5,069,739
[45] Date of Patent: Dec. 3, 1991

[54] AUTOMATIC FLEXIBLE SEAL FITTING MACHINE, SUITABLE FOR FITTING GLAZING UNIT AND WINDOW SEALS

[75] Inventor: Jean-Jacques Kautt, Strasbourg, France

[73] Assignee: Ferco International Usine de Ferrures de Batiment, Sarrebourg, France

[21] Appl. No.: 501,837

[22] Filed: Mar. 30, 1990

[30] Foreign Application Priority Data

May 17, 1989 [FR] France .................................. 89 06441

[51] Int. Cl.⁵ ............................................ B32B 31/18
[52] U.S. Cl. ................................... 156/468; 156/106; 156/107; 156/109; 156/475; 156/486; 156/522; 29/235; 29/564.8; 414/744.3
[58] Field of Search ................. 156/99, 106, 107, 108, 156/109, 468, 475, 486, 522; 29/235, 564.8; 414/744.3

[56] References Cited

U.S. PATENT DOCUMENTS

| | | | |
|---|---|---|---|
| 2,335,376 | 11/1943 | Ballintine et al. | 156/109 |
| 2,924,007 | 2/1960 | Wrightfield | 29/450 |
| 3,295,195 | 1/1967 | Burgio | 29/411 |
| 3,516,884 | 6/1970 | Heeter et al. | 156/106 |
| 4,766,661 | 8/1988 | Croteau | 29/417 |
| 4,906,312 | 3/1990 | Sorensen | 156/109 |
| 5,018,264 | 5/1991 | Kautt | 29/564.8 |

FOREIGN PATENT DOCUMENTS

| | | |
|---|---|---|
| 0110256 | 10/1983 | European Pat. Off. . |
| 0240968 | 10/1987 | European Pat. Off. . |
| 3143611 | 5/1983 | Fed. Rep. of Germany . |
| 3347699 | 7/1985 | Fed. Rep. of Germany . |
| 2520793 | 1/1982 | France . |
| 2572123 | 10/1984 | France . |
| 2022664A | 12/1979 | United Kingdom . |

Primary Examiner—Caleb Weston
Attorney, Agent, or Firm—Fidelman & Wolffe

[57] ABSTRACT

An automatic machine for fitting seals, especially window or glazing unit seals, comprises a window frame feed, referencing and measuring mechanism, a support gantry, a system for paying out the seal and a seal fitting and cutting device. The seal fitting and cutting device comprises a frame, a gantry movable in translation on the frame and a carriage movable in translation on the gantry. A vertical shaft on the carriage is rotatable relative to the carriage. A manipulator head carried by this shaft carries a seal guide system, a seal cutting system and a seal fitting system. A support plate is rotatable about a horizontal axis relative to the shaft and carries two units in turn carrying the seal guide, cutting and fitting systems. These two units are movable up and down in translation relative to the support plate.

15 Claims, 9 Drawing Sheets

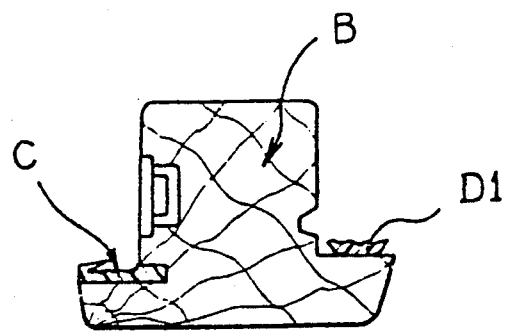
FIG_1A
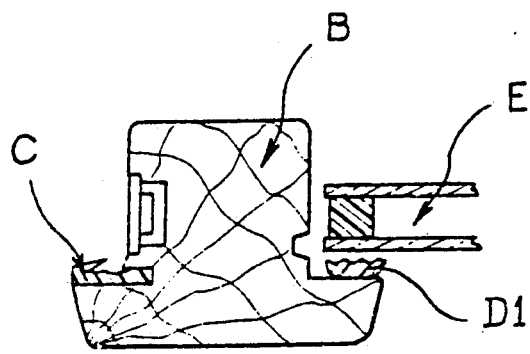
FIG_1B
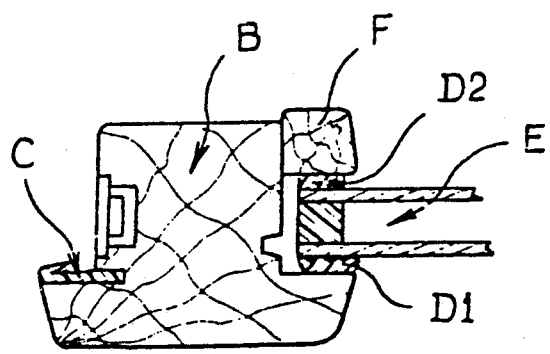
FIG_1C

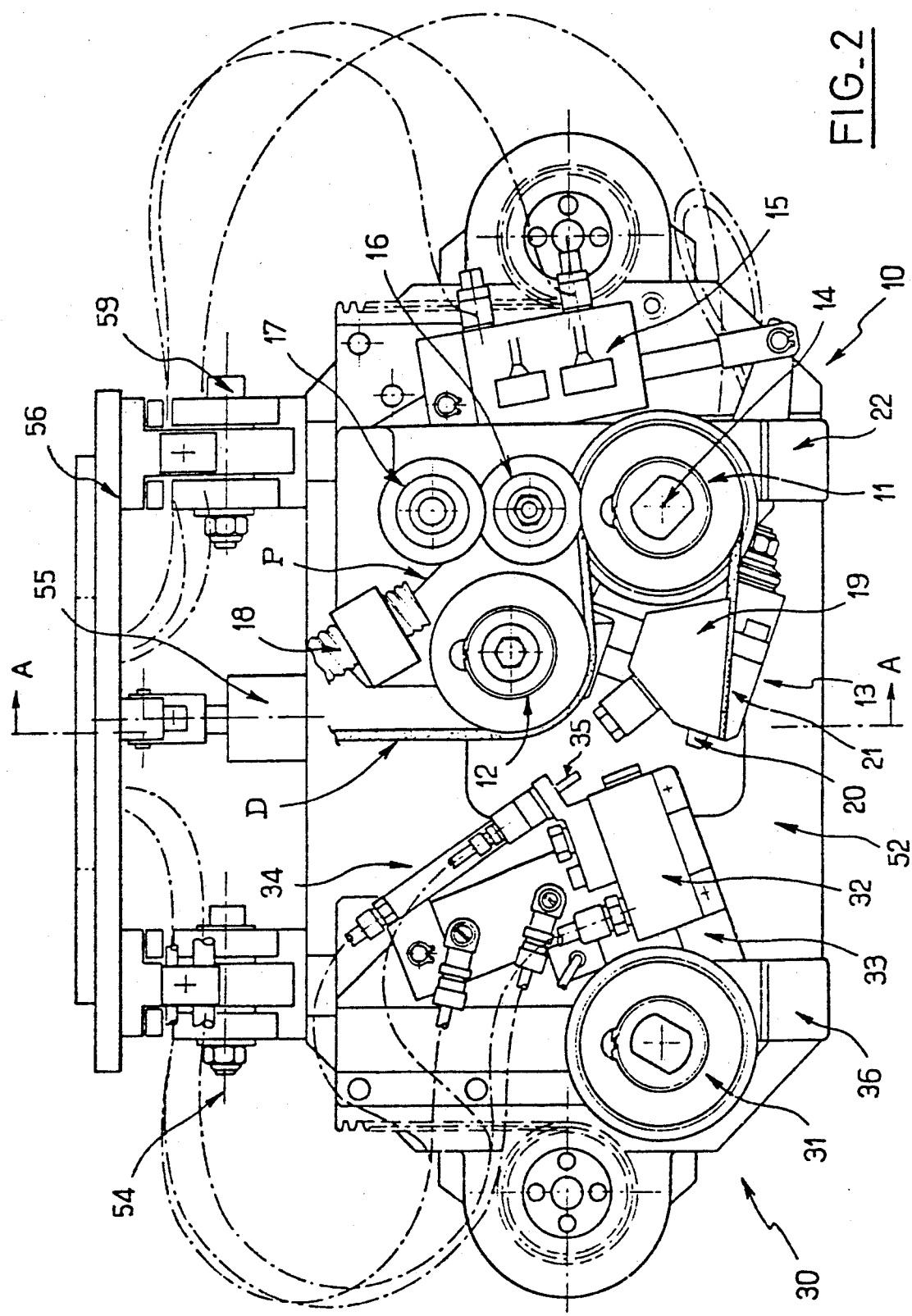
FIG_2

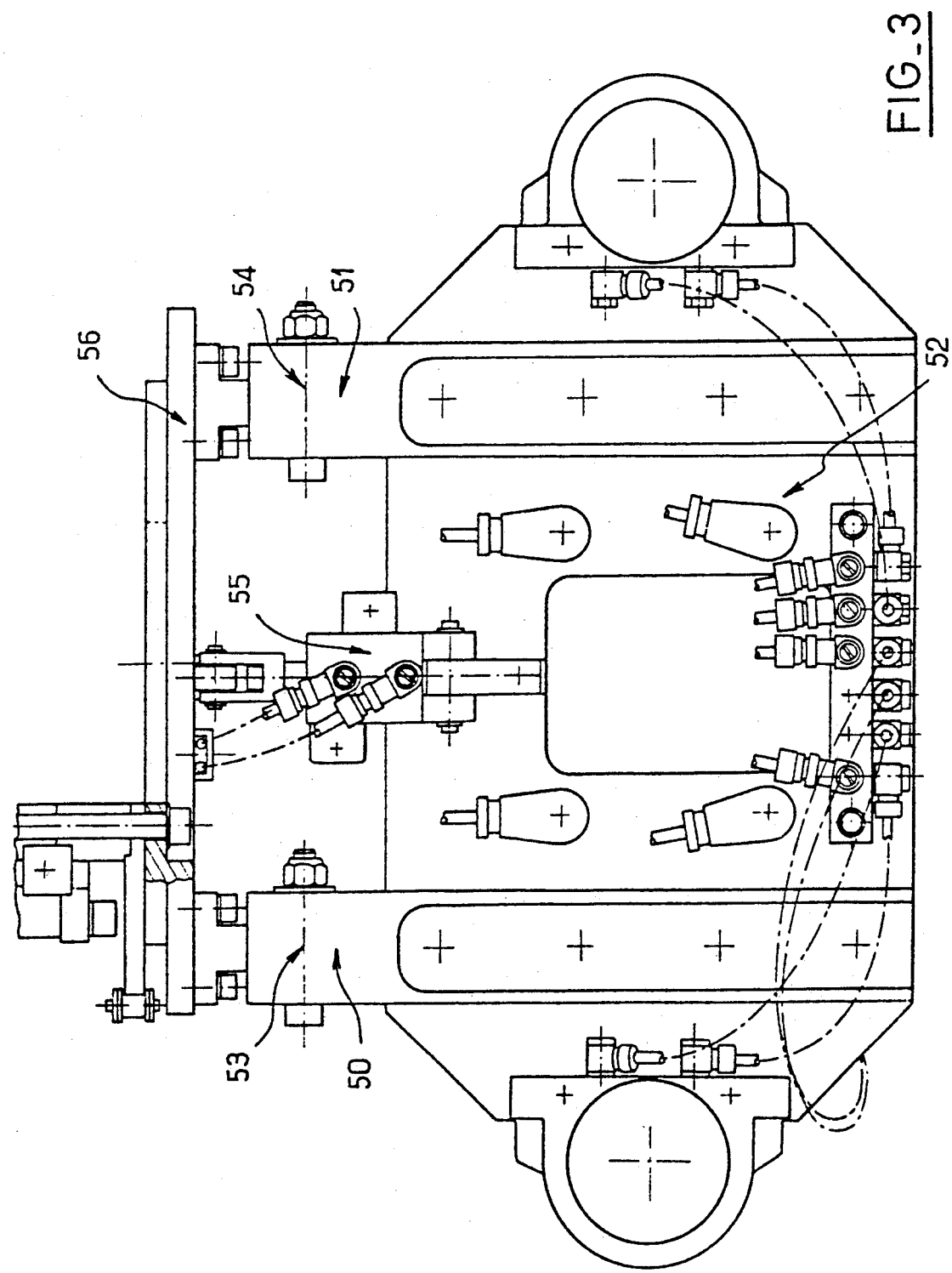
FIG_3

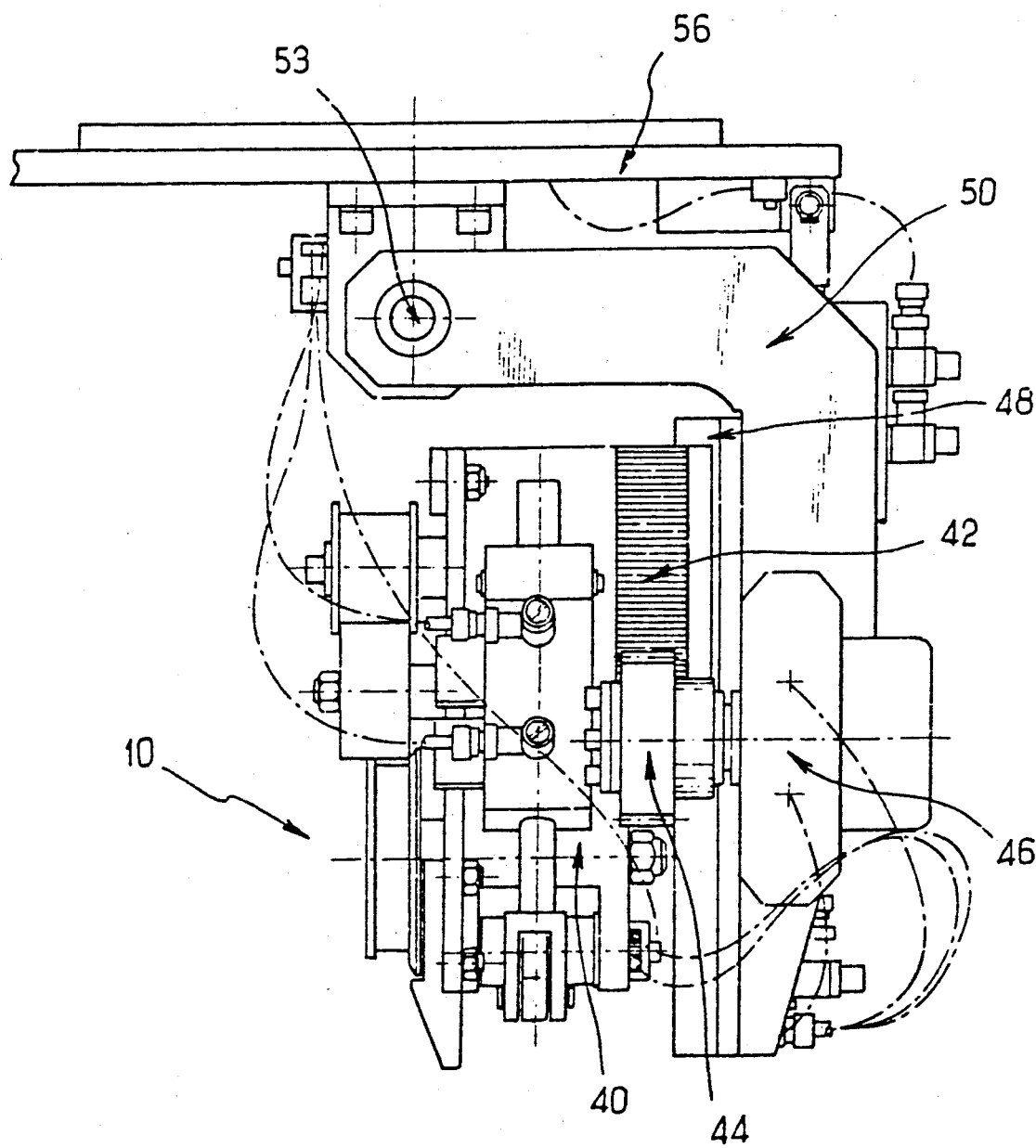
FIG_4

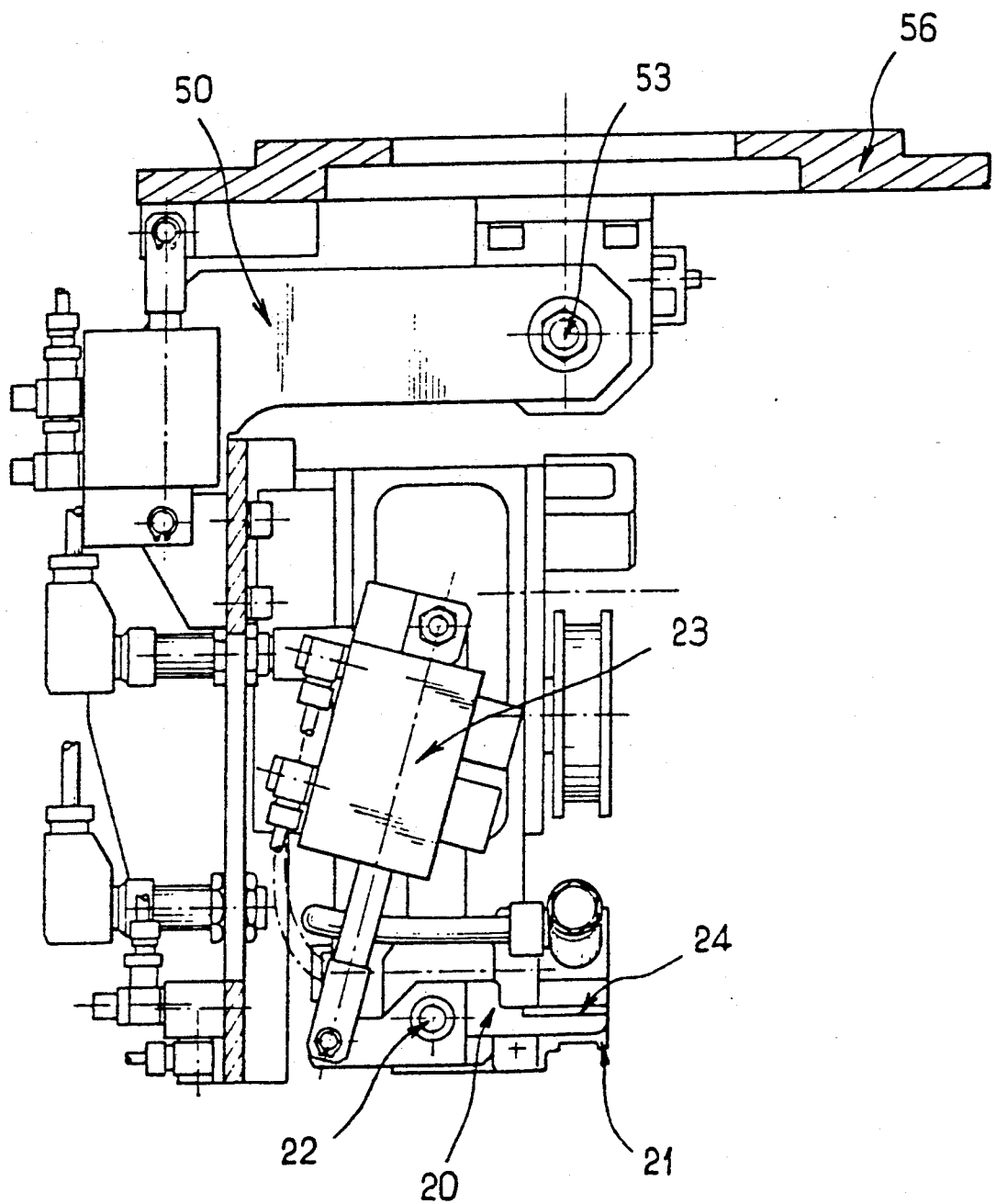
FIG_6

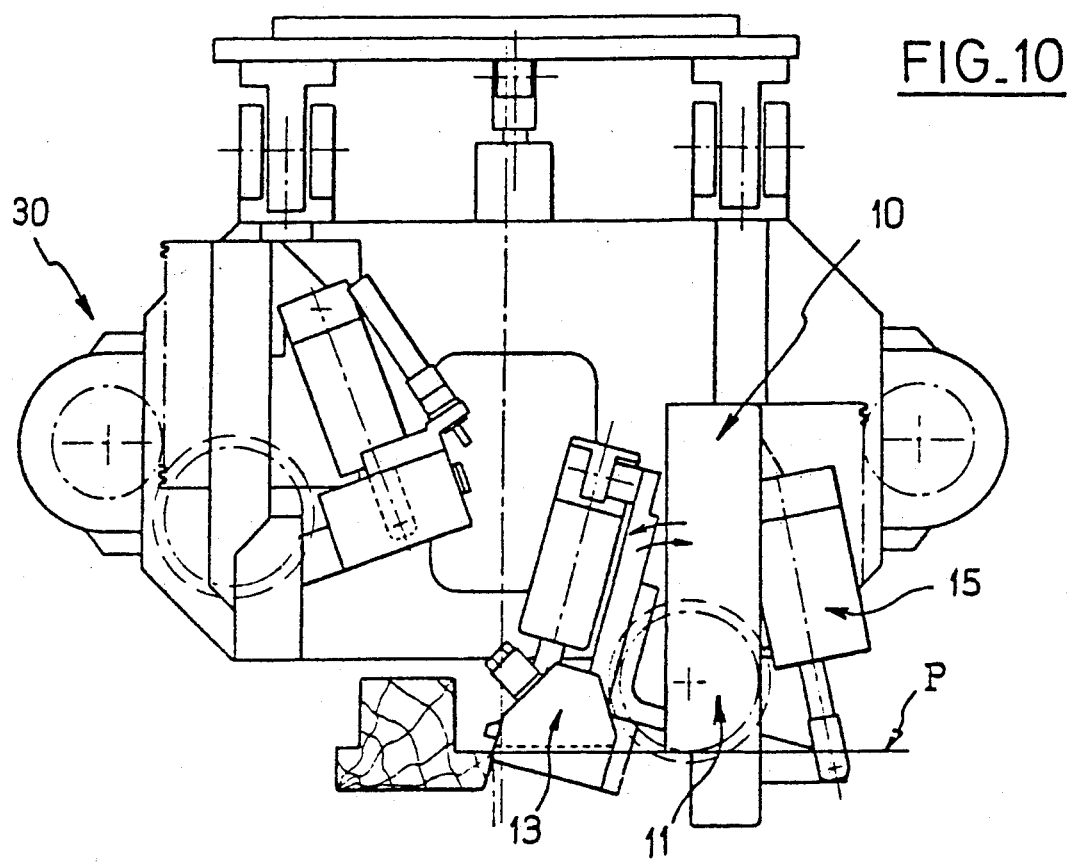
FIG_10
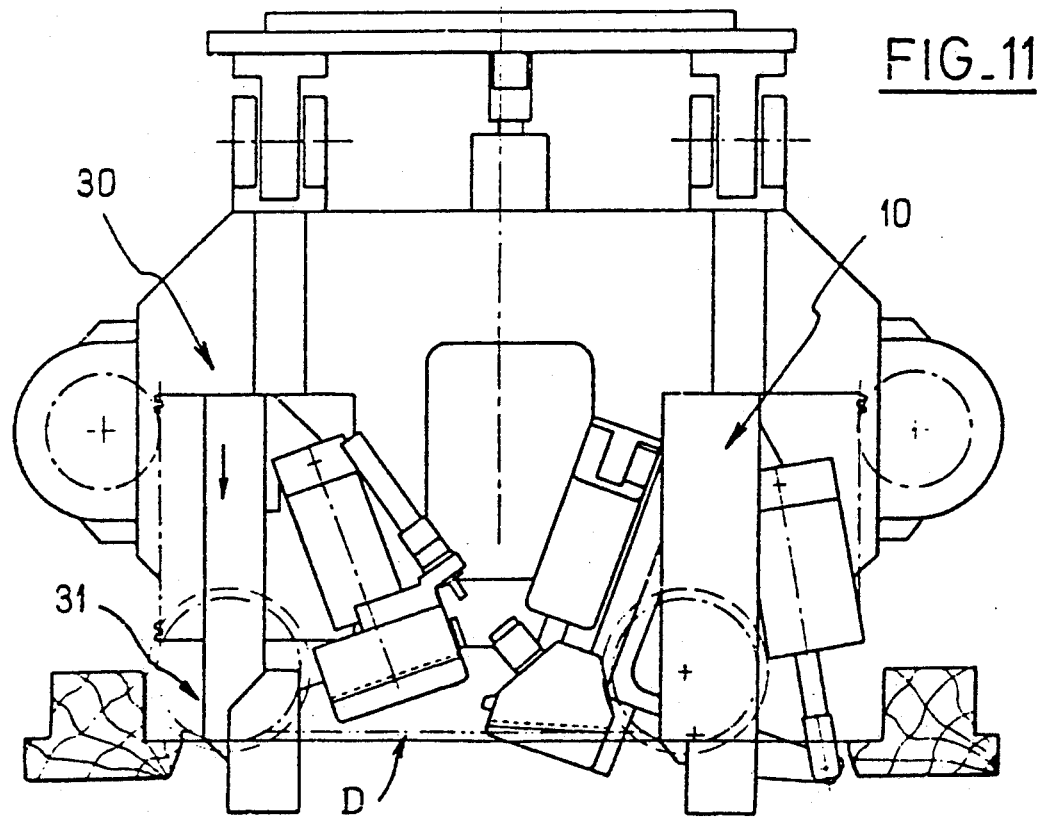
FIG_11

AUTOMATIC FLEXIBLE SEAL FITTING MACHINE, SUITABLE FOR FITTING GLAZING UNIT AND WINDOW SEALS

BACKGROUND OF THE INVENTION

1. Field of the Invention

The invention concerns an automatic machine for fitting flexible seals, in particular glazing unit flexible seals, the machine comprising a loading table, a seal storage device and a seal fitting and cutting device.

2. Description of the prior art

An opening window frame made from wood, plastics material, aluminum or like material generally comprises two horizontal crossmembers and two vertical uprights forming a frame receiving on its outside edge fixtures (ironmongery) for articulating it to or supporting it on the fixed frame. The uprights and crossmembers incorporate internal shoulders to receive the glazing unit or the like and external rebates receiving the various fixtures.

The seal behind the glazing unit and the seal placed on the glazing unit and/or on the beading are conventionally fitted by hand.

The frame is usually laid horizontally; the preformed butyl seal, supplied on a paper backing, is fitted to the back of the internal shoulder on the frame; the glazing unit is fitted; a second preformed butyl seal is fitted and the beading is fitted; all these superposed elements are pressed horizontally to secure adequate compression of the seals and the beading is fixed mechanically, generally by nailing it. These operations are followed by finishing which entails cutting off any butyl flash encroaching on the glazing unit.

To eliminate this flash cutting operation a groove is sometimes provided at the back of the inside shoulder of the frame or of the beading into which the seal is inserted, with the result that it does not encroach laterally on the glazing unit, any excess seal being accommodated within the groove.

The present invention proposes an automatic machine for fitting and cutting the glazing unit seal comprising a frame feed, referencing and measuring mechanism which enables the seal to be fitted automatically, continuously and dynamically with no interaction between the various operations.

The seal fitting and cutting device comprises a frame receiving a gantry. In a manner that is known in itself, this gantry provides for movement in two directions enabling operations to be carried out by a manipulator head.

The frame and the gantry together with their displacement means are known in themselves. Note, however, that it is their displacement that is utilized to pay out the seal.

The supporting gantry and the displacement device comprising a framework, a gantry mobile in translation on the framework and a carriage mobile in translation on the gantry, the latter being adapted to support a manipulator head rotatable relative to the carriage, are as described in our copending French patent application No. 89 03 090 filed Mar. 9, 1989.

The carriage has a central vertical shaft rotated by a vertical axis motor-gearbox unit via a chain transmission. The bottom of this vertical shaft carries the seal manipulator head and the shaft is hollow to enable the seal and cables or hoses supplying the fitting head and its ancillary devices to be passed through it. The shaft rotates between four positions at 90° corresponding to the four sides of the window frame. Its rotation is limited to 360° with a return to the central position each time the frame is changed to minimize twisting of the cables, hoses and seals passing through the hollow shaft. Of course, this mode of operation is in no way limiting since the position of the hollow shaft may be programmed for fitting out frames of various parallelepiped shapes and even frames that are round or of any other shape.

The manipulator head is fixed by screws or like means to the wall of the hollow shaft and is located under the gantry carriage.

SUMMARY OF THE INVENTION

The invention consists in an automatic machine for fitting seals, especially window or glazing unit seals, comprising a window frame feed, referencing and measuring mechanism, a support gantry, a system for paying out the seal and a seal fitting and cutting device, said device comprising:
 a frame,
 a gantry movable in translation on said frame,
 a carriage movable in translation on said gantry,
 a vertical shaft on said carriage rotatable relative to said carriage,
 a manipulator head carried by said shaft,
 seal guide means on said manipulator head,
 seal cutting means on said manipulator head,
 seal fitting means on said manipulator head,
 a support plate rotatable about a horizontal axis relative to said shaft, and
 two units carrying said seal guide, cutting and fitting means movable up and down in translation relative to said support plate.

The invention is described in more detail hereinafter and by way of example only with reference to the appended diagrammatic drawings.

BRIEF DESCRIPTION OF THE DRAWINGS

FIGS. 1A through 1C are cross-sections through one upright of an opening window frame showing the fitting to the frame of the seal behind the glazing unit, the glazing unit itself, the beading seal and the beading itself.

FIG. 2 is a front view of a manipulator head in accordance with the invention.

FIG. 3 is rear view of a manipulator head in accordance with the invention.

FIG. 4 is a righthand side view of a manipulator head in accordance with the invention.

FIG. 6 is a view of a manipulator head in accordance with the invention in cross-section on the line A—A in FIG. 2.

FIGS. 7 through 13 are partial or complete side or rear views showing the fitting of a seal by means of a manipulator head in accordance with the invention.

DETAILED DESCRIPTION OF THE INVENTION

Figure 5:
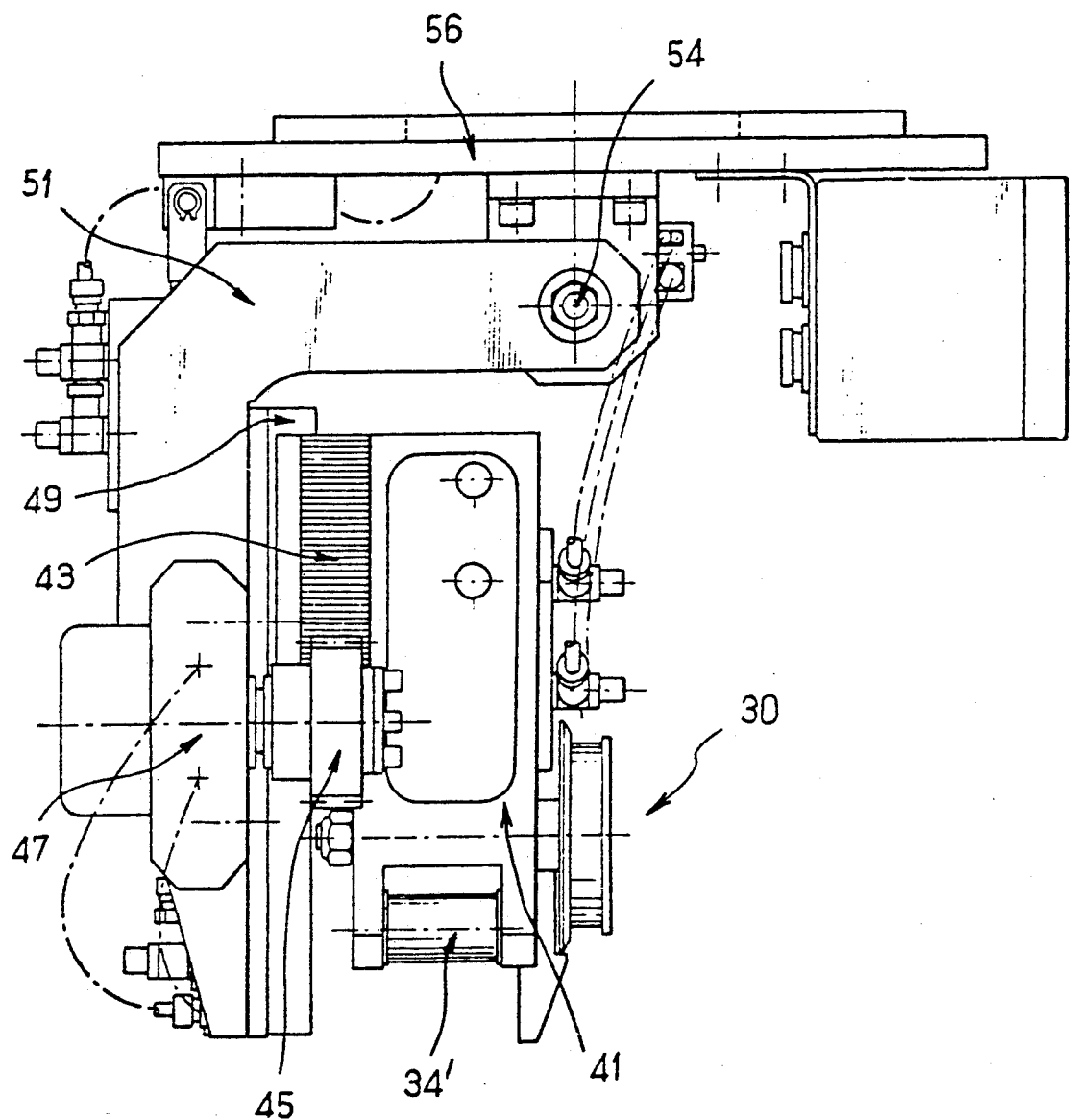
FIG. 5 is a lefthand side view of a manipulator head in accordance with the invention.

As shown in figures 1A through 1C, on the assembly line an opening window frame B is fitted with its exterior seal C, a glazing unit seal D1 behind the glazing unit, then the glazing unit E itself and finally the beading F fitted with its seal D2.

The machine in accordance with the invention is designed to fit the seals D1 and D2 respectively to the window frame B and the beading F and in the remainder of this description the seal is referred to generically as D and only the fitting of the seal to the window frame B is described. It obvious that in this description references to the window frame B may be replaced by references to the beading F.

As previously mentioned, the manipulator head is designed to be mounted at the bottom of a rotatable shaft on a displacement control carriage.

The manipulator head comprises two fitting units: a start of fitting unit 10 and an end of fitting unit 30, the operation of which will be described in more detail later.

The start of fitting unit 10 comprises two main rollers 11 and 12. The roller 11 is a seal fitting roller and the roller 12 is a seal guide roller. The seal is fed vertically through the hollow shaft to engage the main roller 12 and is then looped around the roller 11. These two rollers are idler rollers, in other words they are not motor-driven; it is the seal already fixed to the window frame which pays out the seal by pulling on it, which rotates the rollers 11 and 12. To prevent it becoming distorted the seal D is usually provided with an internal anti-stretching wire.

The start of fitting unit 10 also includes a cutting unit 13 downstream of the roller 11 and supporting the seal 10 by suction or mechanical means. The cutting unit 13 is mounted to oscillate perpendicular to the plane of the window frame about the axis 14 of the fitting roller 11. The unit 13 is displaced by an actuator 15.

The seal D is covered with a protective paper tape which must be removed as the seal is fitted to the window frame B. The paper P is removed by two rollers 16 and 17. The first roller 16 cooperates with the fitting roller 11 to remove the paper P. The seal arrives from the roller 12 with the paper between the two rollers 11 and 16; the paper P is then guided around the roller 16 and then between the two rollers 16 and 17 and sucked away by a vacuum pump through a hose 18. The fitting roller 11 and the paper removal roller 16 are each fitted with a resilient tire so as to avoid crushing the seal D. In a preferred embodiment all these rollers are idler rollers; the roller 11 is rotated by the seal D already fixed and rotates the roller 16 which in turn rotates the roller 17.

In an alternative embodiment the roller 17 may be motor-driven in order to regulate the speed of the paper removal roller 16.

More generally, a device for applying traction to the peeled off paper P between the rollers 16 and 17 may be provided and would have the advantage of simultaneously entraining the seal and so paying out the seal D. In this case the paper traction speed would have to be precisely set to avoid loss of synchronization between the speeds of the removed paper and the seal from which the paper has been removed.

The cutting unit 13 of the start of fitting unit 10 includes a suction chamber 19 retaining the seal D and a cutting device comprising a knife member 20 and an anvil member 21. The cutting unit 13 is seen in the lefthand side view of FIG. 6. It includes an anvil 21 fixed relative to the unit 13 and comprising a downwardly facing groove to guide the seal D. It is also fitted with a knife member 20 pivoting about an axis 22 parallel to the longitudinal direction of the window frame crossmember and operated by an actuator 23. In FIG. 6 the knife 20 is shown in the "closed" or inactive position. Retraction of the piston rod of the actuator 23 lowers the knife 20 to the "open" position; when it is raised the knife 20 engages the seal D and cuts through it by virtue of the cutting edge 24 at its top.

The end of fitting unit 30 includes a bearing idler roller 31, a suction chamber 32 and a single-point bearing actuator 34.

The suction chamber 32 is designed to hold the seal D after it is cut by the cutting unit 13 of the start of fitting unit 10, to bend it and to press it at the end of fitting against the surface of the window frame.

To this end the suction chamber 32 is mounted on an arm 33 oscillating about a spindle 34' by means of a yoke system and operated by an actuator, as can be seen in FIG. 5.

Attached to the suction chamber 32 is an actuator 34 whose piston rod 35 extends downwardly at a slight angle; the piston rod 35 is designed to press the cut end of the seal D into the corner of the window frame B.

Each of the units 10 and 30 is provided with a respective guide skid 22 and 36 designed to be applied laterally to the internal rebate on the window frame B and to guide the manipulator head.

As is seen particularly clearly in FIGS. 4 and 5, the two units 10 and 30 are mounted on respective supports 40 and 41. Each support 40, 41 comprises a respective rack 42, 43 engaged with a respective vertical translation control carriage 44, 45 of the respective unit 10, 30. To this end, each carriage 44, 45 is driven by a respective rotary actuator 46, 47. The vertical guidance provided by the racks 42, 43 is complemented by a respective guide rail 48, 49.

Each of these assemblies is mounted on a respective boom 50, 51. The two booms 50 and 51 are fixed side by side to a common support plate 52.

The upper ends of the booms 50, 51 pivot about two aligned horizontal axes 53, 54. The resulting manipulator head mobile assembly is rotated by a central actuator 55. The two axes 53, 54 form part of articulations to a horizontal delivery plate 56 designed to be mounted on the rotary vertical hollow shaft of the carriage controlling displacement in a plane parallel to the general plane of the window frame.

The fitting of a glazing unit seal D to the internal rebate on a window frame B using a manipulator head in accordance with the invention will now be described with reference to FIGS. 7 through 13.

At the start of fitting (FIG. 7), the start of fitting unit 10 is lowered by its carriage and rack arrangement until the guide skid 22 crosses the plane P of the back of the inside rebate on the window frame B.

The start of fitting unit 10 is then pivoted (FIG. 8) until the guide skid 22 abuts laterally against the inside of the window frame B.

Figure 9:
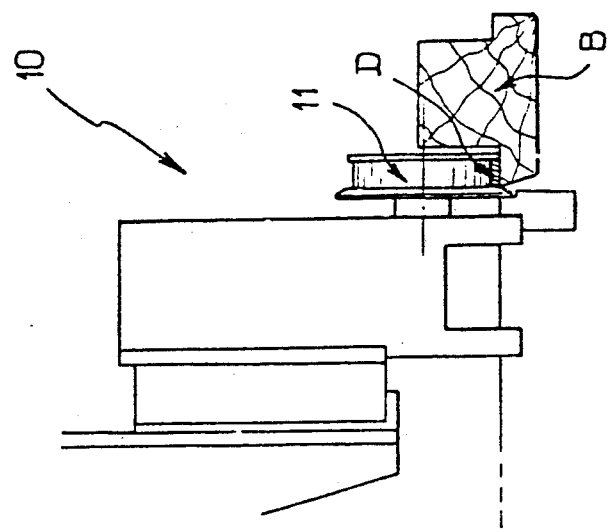
Figure 8:
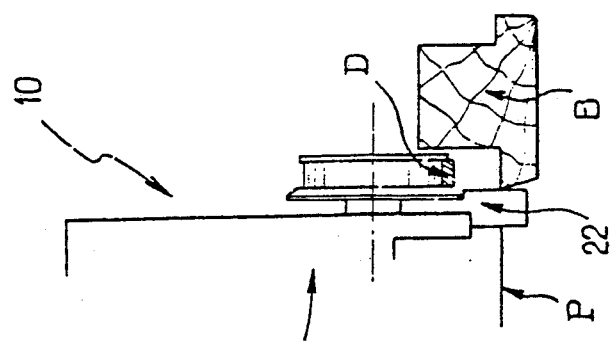
Figure 7:
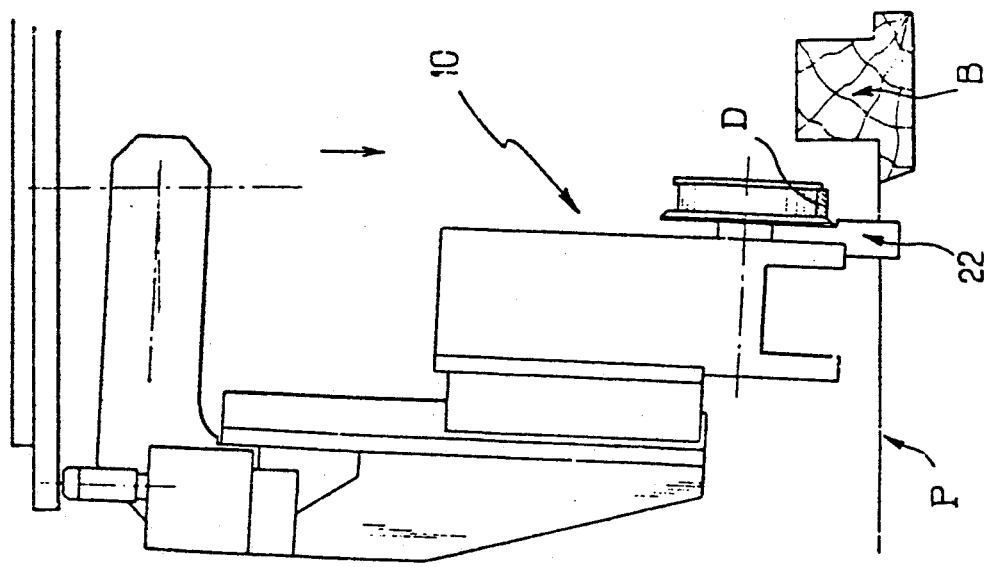

The unit 10 is then lowered until the roller 11 applies and sticks the seal to the back of the inside rebate on the window frame B (FIG. 9).

This latter position is also shown from the rear in FIG. 10. The start of fitting unit 10 presses and sticks the seal by means of the roller 11 and the unit 13 which is pivoted into contact with the seal by the actuator 15. The end of fitting unit 30 is inactive at this time, in its highest position.

As soon as the manipulator head has advanced sufficiently far along the window frame rebate to leave sufficient room or to be at a particular distance from the next perpendicular crossmember, the end of fitting unit 30 is activated (FIG. 11). It is lowered by its carriage and rack arrangement until the bearing roller 31 comes into contact with the seal already fitted to the back of the window frame B rebate.

Figure 12:
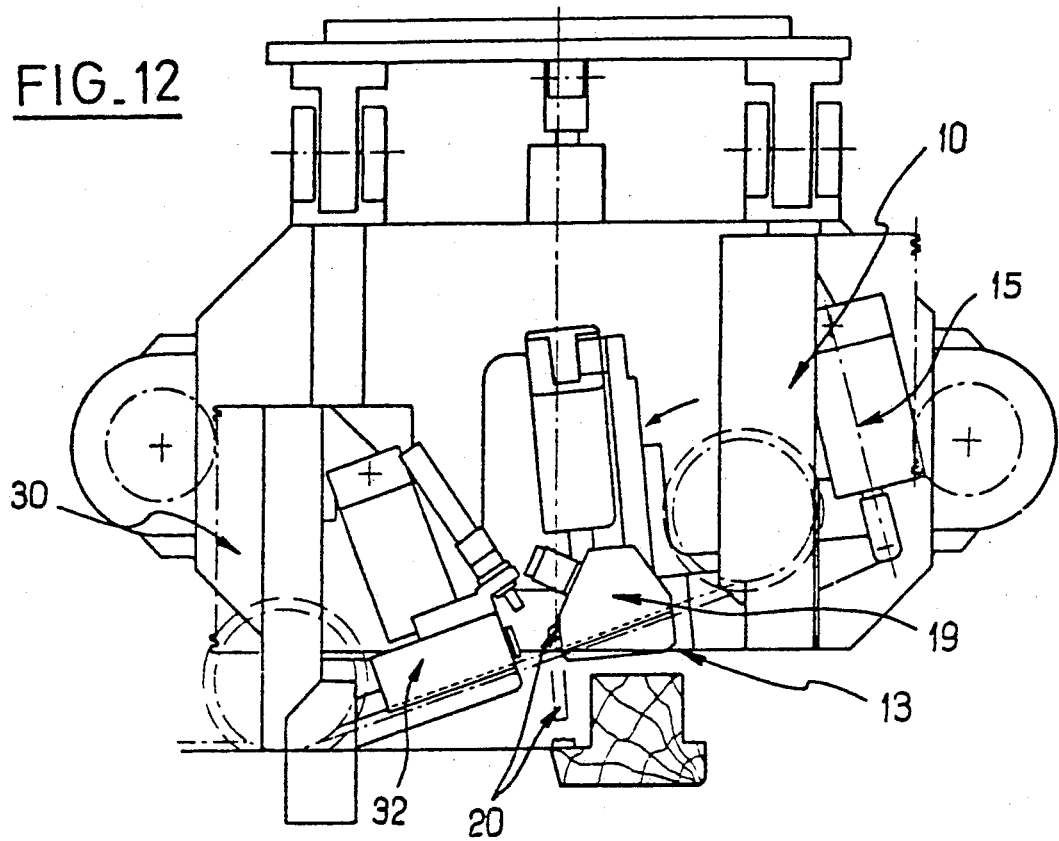
Figure 13:
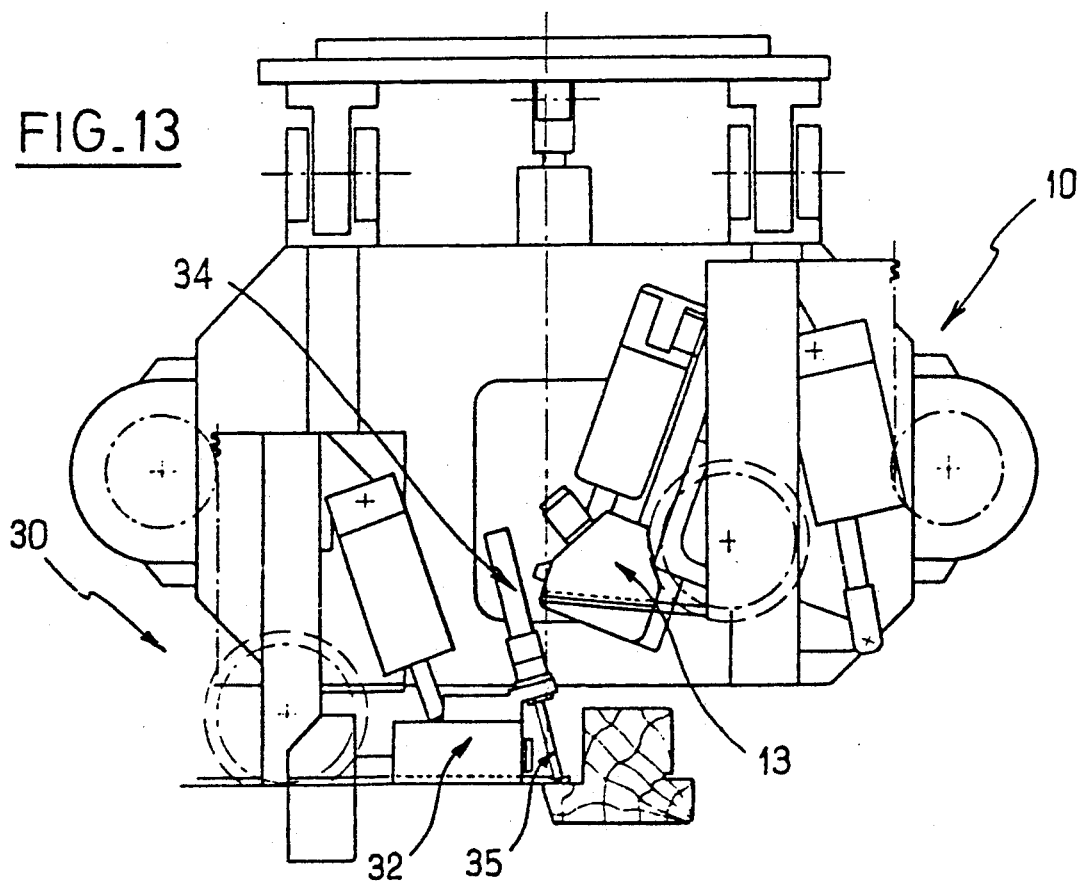

When the manipulator head reaches the end of its travel, near the next perpendicular crossmember, the start of fitting unit 10 is raised by its carriage and rack arrangement (FIG. 12). At the same time, its cutting unit 13 is pivoted by the actuator 15 to open the knife 20 (from the position shown in full line to the position shown in chain-dotted line). The seal is then held against the suction chambers 19 and 32.

The seal is cut (FIG. 13) by the cutting unit 13 by raising the knife 20. The suction chamber 32 is then pivoted downwards to fit and press the seal against the back of the rebate. Finally, the single-point bearing actuator 21 is operated and its piston rod 35 moves downwards to press and stick the free end of the seal.

There is claimed:

1. A machine for automatically fitting a seal into a window opening frame comprising frame feed means for feeding window frames to be fitted with said seal, means for determining characteristics and dimensions of a frame fed by the frame feed means and manipulation means for manipulating the seal, wherein said manipulation means comprises:
   a framework;
   a gantry movable along said framework;
   a carriage movable along said gantry; and
   a manipulator head mounted on a vertical shaft of the carriage such that said manipulator head and vertical shaft are rotatable in relation to said carriage, said manipulator head including a first unit comprising first fitting means for fitting a portion of the seal into a window frame, guide means for guiding the seal to said first fitting means and cutting means for cutting the seal, and a second unit comprising second fitting means for fitting a portion of a cut seal against the window frame,
   wherein each of said first and second units are vertically movable between an upper position and a lower position.

2. The machine according to claim 1, wherein said manipulator head is rotatable in increments of 90° for fitting a rectangular window frame.

3. The machine according to claim 1, wherein each of said first and second units are vertically movable in relation to a window frame being fitted with the seal.

4. The machine according to claim 1, wherien said first unit further comprises means for removing a protective paper from a self-adhesive seal.

5. The machine according to claim 4, wherein said first fitting means comprises an idler roller.

6. The machine according to claim 4, wherein said guide means comprises a roller.

7. The machine according to claim 4, wherein said cutting means comprising a cutting unit positioned to cut said seal after the seal is positioned by said first fitting means, said cutting unit comprising a cutting device and means for holding a portion of the seal near said cutting device while the seal is being cut.

8. The machine according to claim 7, wherein said means for holding comprises a suction chamber.

9. The machine according to claim 7, wherein said cutting device comprises a pivotable knife.

10. The machine according to claim 4, wherein said means for removing a protective paper comprises two rollers, a first roller engaging with said first fitting means such that the protective paper is separated from the seal and a second roller for guiding removed paper to means for discarding the removed paper.

11. The machine according to claim 10, wherein said means for discarding the removed paper comprises a vacuum pump and a hose connected thereto for receiving the removed paper.

12. The machine according to claim 1, wherein said second unit further comprises pressing means for pressing a portion of the seal against the window frame while the seal is being cut by said cutting means and holding means for holding another portion of the seal near the cutting means while the seal is being cut by said cutting means.

13. The machine according to claim 12, wherein said pressing means comprises an idler roller for contacting the seal.

14. The machine according ot claim 12, wherein said holding means comprises a suction chamber.

15. The machine according to claim 14, wherein said second fitting means comprises a single-point bearing actuator fastened to said suction chamber and having a downwardly directed piston rod.

* * * * *